United States Patent [19]

Cunningham

[11] 4,092,871

[45] June 6, 1978

[54] PRECISION DRIVE MECHANISM FOR CONVERTING FIXED RECIPROCATING MOTION TO ADJUSTABLE RECIPROCATING MOTION

[75] Inventor: Patrick J. Cunningham, Fullerton, Calif.

[73] Assignee: Dyne Corporation, Anaheim, Calif.

[21] Appl. No.: 656,406

[22] Filed: Feb. 9, 1976

[51] Int. Cl.² .......................................... F16H 21/32
[52] U.S. Cl. ...................................................... 74/40
[58] Field of Search ................... 74/53, 551, 12; 64/8; 310/77

[56] References Cited

U.S. PATENT DOCUMENTS

| | | | |
|---|---|---|---|
| 1,035,169 | 8/1912 | Draver | 74/12 |
| 1,555,094 | 9/1925 | Adams | 310/77 |
| 2,548,807 | 4/1951 | Morgal et al. | 74/41 |
| 3,406,534 | 10/1968 | Chapper | 64/8 |
| 3,646,822 | 3/1972 | Pocaterra | 74/53 |

Primary Examiner—Wesley S. Ratliff, Jr.
Attorney, Agent, or Firm—Raymond L. Madsen

[57] ABSTRACT

There is disclosed a precision drive mechanism having a base member with a drive plate slidably connected thereto, the drive plate having an elongated slot engaged by a bearing member, which in turn is threadably coupled to a lead screw. A pivot frame having an elongated arm is pivotally connected to the base member and is slidably engaged by the bearing member, the pivot frame being adapted to be connected to a source of fixed reciprocating motion whereby the drive plate is moved by the pivot frame in variable reciprocating motion precisely adjusted by moving the bearing member along the elongated arm of the pivot frame through rotation of the lead screw.

6 Claims, 6 Drawing Figures

PRECISION DRIVE MECHANISM FOR CONVERTING FIXED RECIPROCATING MOTION TO ADJUSTABLE RECIPROCATING MOTION

The present invention relates to apparatus for converting fixed reciprocating motion into variable reciprocating motion and more particularly to pump liquid delivery instruments designed for extremely accurate diluting and dispensing of micro and sub-micro volumes.

In the field of metering and dispensing apparatus, it has been the general practice to employ mechanisms for converting fixed rotary reciprocal motion to adjustable sinusoidal or rectilinear reciprocating motion to actuate the piston of a pump, the length of stroke of the piston being selectively adjustable within the motion conversion mechanism. Although such devices have served the purpose, they have not proved entirely satisfactory under all conditions of service for the reason that considerable difficulty has been experienced in obtaining a repeatable reference from which the piston is always driven and difficulties encountered in the number and complexity of mechanical devices and components required to provide precise adjustable motion conversion.

Those concerned with the development of apparatus for repeatedly metering and dispensing predetermined quantities of liquid by means of a piston pump have long recognized the need for a simple, reliable and accurate and precise driving mechanism for the piston which provides adjustment of the length of the piston stroke to repeatedly dispense precise quantities of liquid. The present invention fulfills this need.

One of the most critical problems confronting designers of metering and dispensing apparatus with a pump having intake and discharge strokes has been the provision of a repeatable reference position to which the piston returns after completion of each discharge and intake stroke. This problem is overcome by the present invention.

In the field of automatic pipettes for biomedical laboratories, simple adjustment and extremely accurate diluting and dispensing of micro and sub-micro volume is required. Typical applications include the preparation of samples for microchemistry procedures such as electrolyte level determinations, enzyme activity studies and various radiochemical techniques. Such automatic pipettes must handle liquid quantities rapidly, accurately and in repeatable volumes. The present invention provides this capability.

A typical prior art mechanism for converting a rotary movement into a reciprocating rectilinear movement of variable amplitude for driving the piston of a dispensing pump is disclosed in U.S. Pat. Nos. 3,614,896 and 3,706,233. The mechanism disclosed in these patents utilizes an eccentric device to accomplish the motion conversion. This motion conversion mechanism is complex and does not permit adjustment to provide extremely small piston strokes or the dispensing of minute liquid volumes approaching and reaching zero magnitudes. The present invention overcomes this difficulty.

The general purpose of this invention is to provide a precision adjustable drive mechanism for converting fixed reciprocating motion to variable reciprocating motion which embraces all the advantages of similarly employed motion converting eccentric devices and possesses none of the aforedescribed disadvantages. To attain this, the present invention contemplates the unique combination of an adjustable bearing movably mounted on a reciprocating pivot frame and which slidably engages an elongated slot of a drive plate connected to the piston of a positive displacement pump whereby mechanical complexity and problems of accuracy and repeatability of extremely small volume piston strokes are avoided.

An object of the present invention is the provision of a reciprocating motion converter which provides adjustable reciprocating motion from substantially zero to any desired magnitude.

Another object is to provide precisely adjustable rectilinear motion which has a repeatable reference position at one extreme of the range of motion.

Still another object is to provide a precision drive mechanism for converting fixed rotary motion into adjustable reciprocating rectilinear motion which has a precise repeatable reference position.

A further object of the invention is the conversion of fixed arcuate reciprocating motion to rectilinear reciprocating motion which is adjustable in amplitude from substantially zero to any desired value.

Yet another object is the provision of a mechanism which adjustably drives the piston of a positive displacement pump in accurate and precise repeatable strokes to dispense accurately and precisely known fluid volumes.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
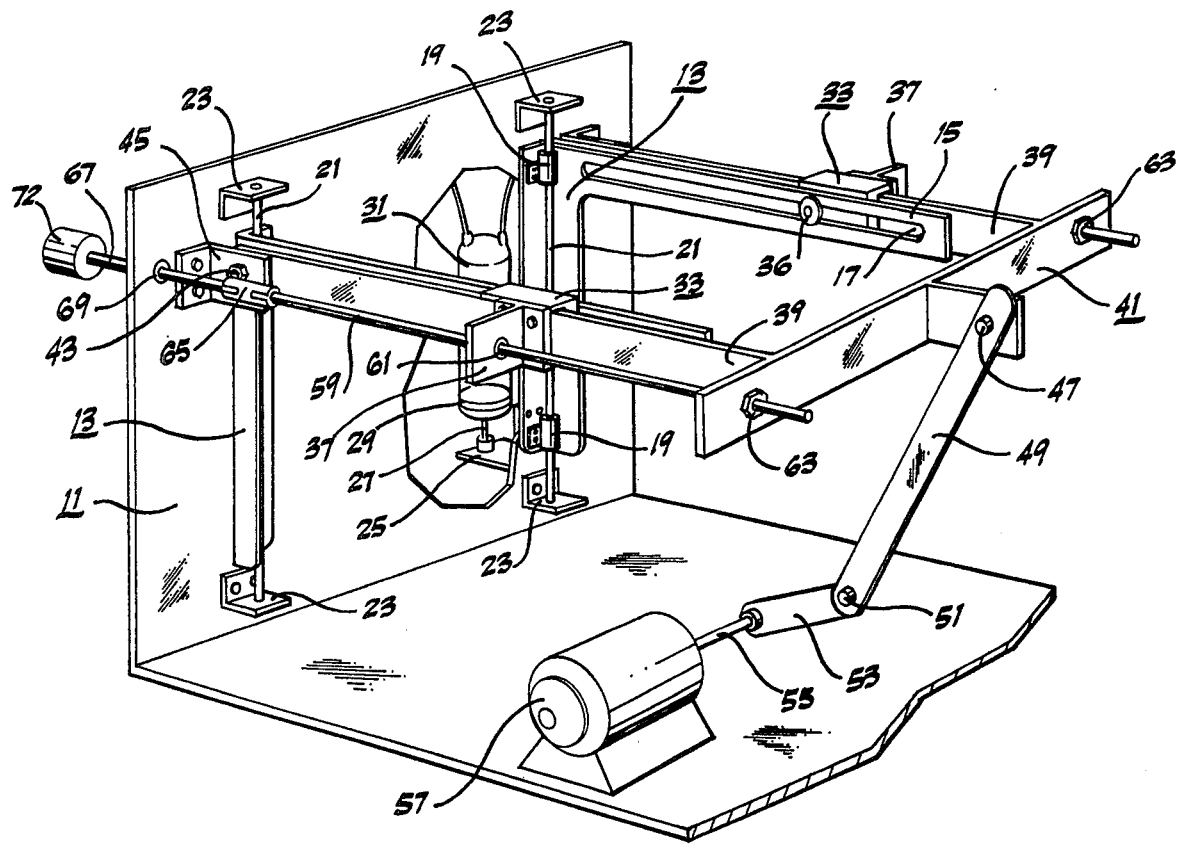
FIG. 1 shows a cut-away perspective view of a preferred embodiment of the invention.

Referring now to the drawings, wherein like reference characters designate like or corresponding parts throughout the several views, there is shown in FIG. 1 (which illustrates a preferred embodiment) a base member or mounting cabinet 11 to which is slidably attached a drive plate 13 having an extended arm 15 with an elongated slot 17 therein, drive plate 13 having a pair of cylindrical bearings 19 attached thereto and which slidably engage a supporting slide rod 21 which in turn has the ends thereof connected by mounting brackets 23 to base member 11. Drive plate 13 has a piston bracket 25 attached thereto which in turn is connected by a piston shaft 27 to a piston 29 within a syringe or pump cylinder 31. A bearing member 33 has a wheel bearing 35 rotatably attached thereto which engages slot 17 of extended arm 15 of drive plate 13. Bearing member 33 further has a channel therein which is partially covered at one end by a "T" shaped drive bracket 37. An elongated arm 39 of a pivot frame 41 is slidably engaged in the channel of bearing member 33 and held therein by drive bracket 37. Pivot frame 41 is rotatably attached to base member 11 by a bolt 43 passing through an opening in one end of elongated arm 39 and into an angle bracket 45 mounted on base member 11.

The other end of elongated arm 39 of pivot frame 41 is connected through a pin or bolt 47 to one end of a driving rod 49 which in turn has the other end thereof connected by a pin or bolt 51 to one end of a crank or connecting arm 53 which in turn has the other end thereof connected to a shaft 55 of a motor 57. A drive screw 59 threadably engages a nut 61 fixedly mounted in drive bracket 37. Lead screw 59 passes through an extension of pivot frame 41 adjacent the other end of elongated arm 39 and is rotatably secured therein by a nut 63 fixedly attached to lead screw 59. Lead screw 59 is further connected through a coupling 65 to a drive shaft 67 which rotatably passes through a bearing 69 mounted in base member 11. A knob 72 is attached to drive shaft 67 for rotating lead screw 59. Pivot frame 41 further has a second elongated arm 39 with a second set of elements cooperating therewith in a substantially identical mirror image configuration as described above in respect to the first elongated arm 39. A second bearing member 33 slides along second arm 39 and engages a second drive plate 13 in the same manner as the previously described components.

Figure 2:
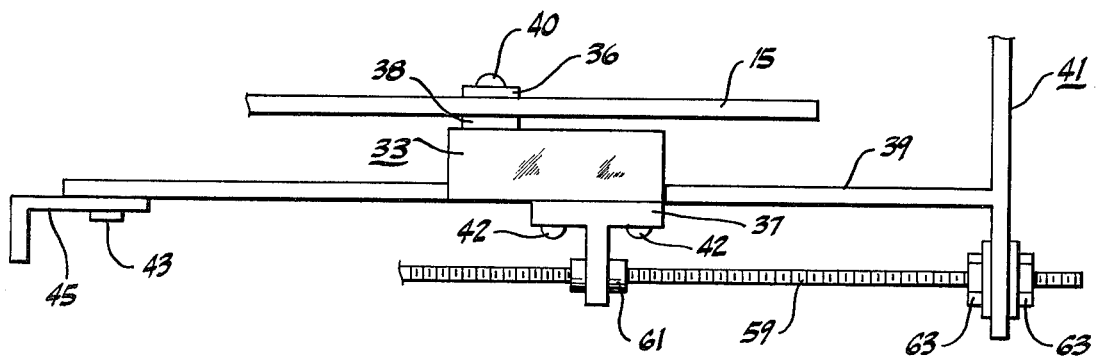
FIG. 2 illustrates a top plan view of the bearing and lead screw mechanism of the apparatus of FIG. 1.

In FIG. 2 a portion of pivot frame 41 is illustrated with bearing 33 mounted thereon and further shows how lead screw 59 is connected to bearing member 33 which in turn slidably engages slot 17 (not visible) in elongated arm 15 of drive plate 13. Bearing member 33 is slidably coupled to elongated arm 39 of pivot frame 41 and secured on elongated arm 39 by "T" brakcet 37 attached to bearing member 33 by bolts 42. Wheel bearing 35 (not visible) engages the elongated slot 17 (not visible) in extended arm 15 of drive plate 13. A bolt 40 passes through a washer 36 on one side of wheel bearing 35 and then through bearing 35 located in slot 17 of extended arm 15 and further passes through washer 38 and then into the body of bearing member 33. Thus, extended arm 15 is slidably engaged with bearing member 33. Lead screw 59 engages nut 61 fixedly attached to "T" bracket 37 and is further rotatably engaged to pivot frame 41 by nuts 63 fixedly attached to lead screw 59. Elongated arm 39 of pivot frame 41 is further connected through bolt 43 to bracket 45 which in turn is attached to base member 11 (not illustrated).

Figure 3:
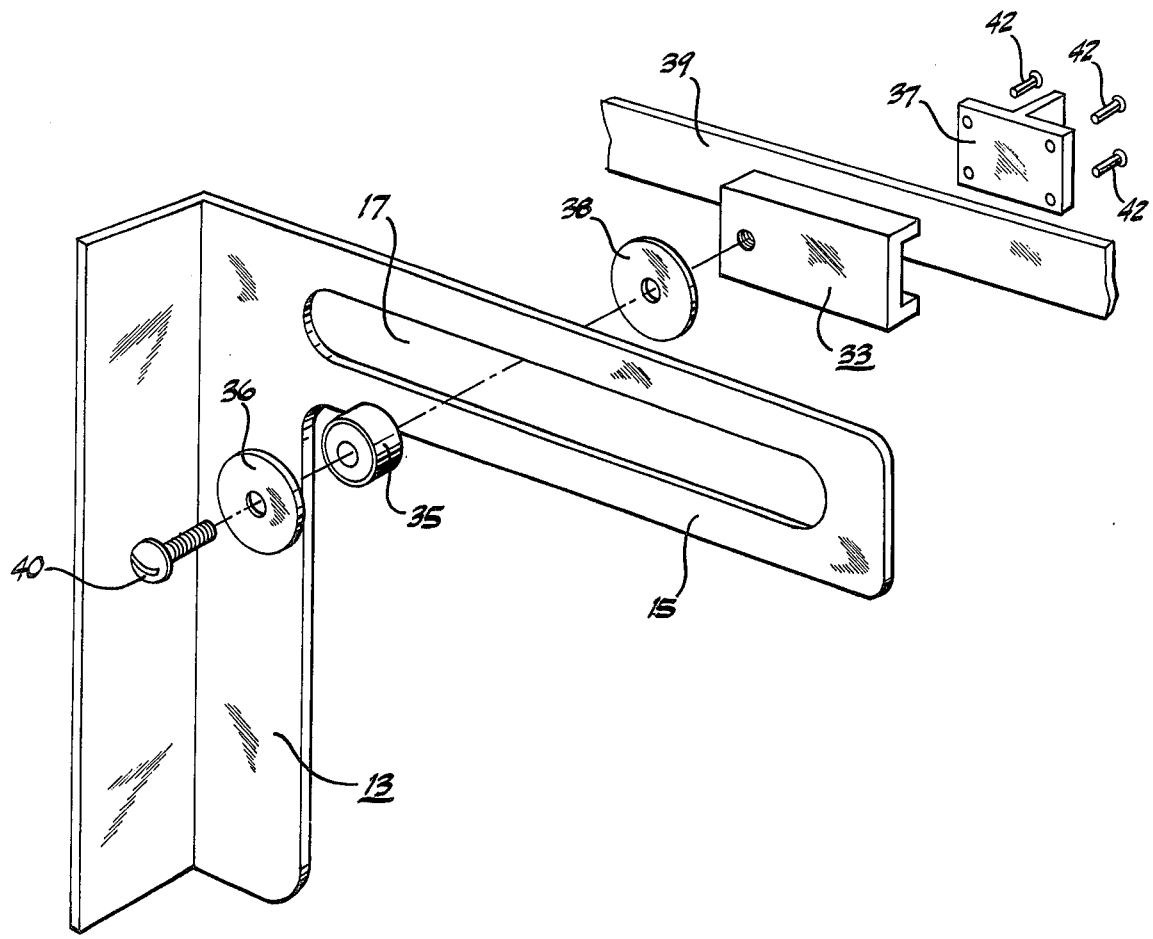
FIG. 3 illustrates a perspective exploded view of the bearing and drive plate assembly of the apparatus of FIG. 1.

Turning now to FIG. 3, there is illustrated a perspective exploded view of the details connecting drive plate 13 through bearing member 33 to elongated arm 39 of pivot frame 41. Bearing member 33 has the channel thereof engaged by elongated arm 39 of pivot frame 41, elongated arm 39 being slidably clamped in the channel of bearing member 33 by "T" drive bracket 37 attached to bearing member 33 by bolts 42. Driving plate 13 has extended arm 15 with elongated slot 17 therein engaged by wheel bearing 35 having washers 36 and 38 on either side thereof, bolt 40 passing through washers 36 and 38 and wheel bearing 35 and threadably engaging bearing member 33.

Figure 4:
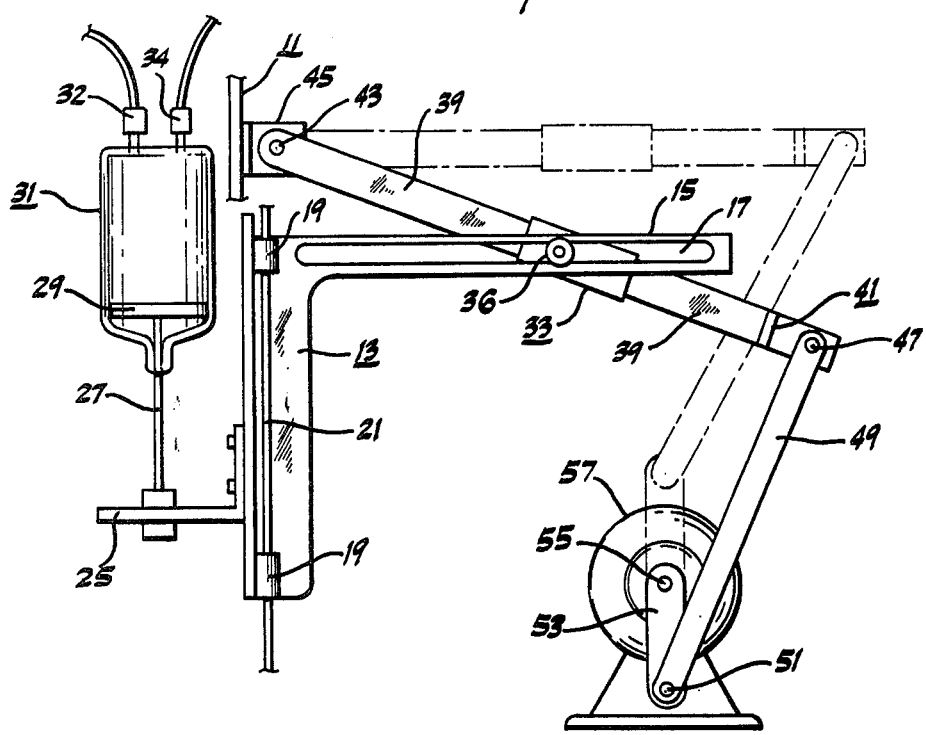
FIG. 4 illustrates a side elevation of pump, drive plate and pivot frame of the apparatus of FIG. 1.

In FIG. 4, the basic mechanism of the present invention is illustrated showing drive plate 13 with extended arm 15 and elongated slot 17 therein being slidably attached through cylinder bearings 19 to rod 21, rod 21 being shown cut-away from its supporting components. Wheel bearing 35 (not visible behind washer 36) engages elongated slot 17 and is connected to bearing member 33 which further engages elongated arm 39 of pivot frame 41. Pivot frame 41 is further attached through bolt 43 to bracket 45 which in turn is attached to base member 11 of which a cut-away portion is shown. Drive plate 13 is further attached through piston bracket 25 to piston shaft 27 which in turn is connected to piston 29 located within pump cylinder 31. Pump cylinder 31 has check valves 32 and 34 located thereon to provide an inlet and an outlet for fluids entering or leaving the pump cylinder volume. Pivot frame 41 is further connected through bolt 47 to drive rod 49 which in turn is connected through bolt 51 to connecting arm 53 which in turn is fixedly attached to shaft 55 of motor 57.

Figure 5:
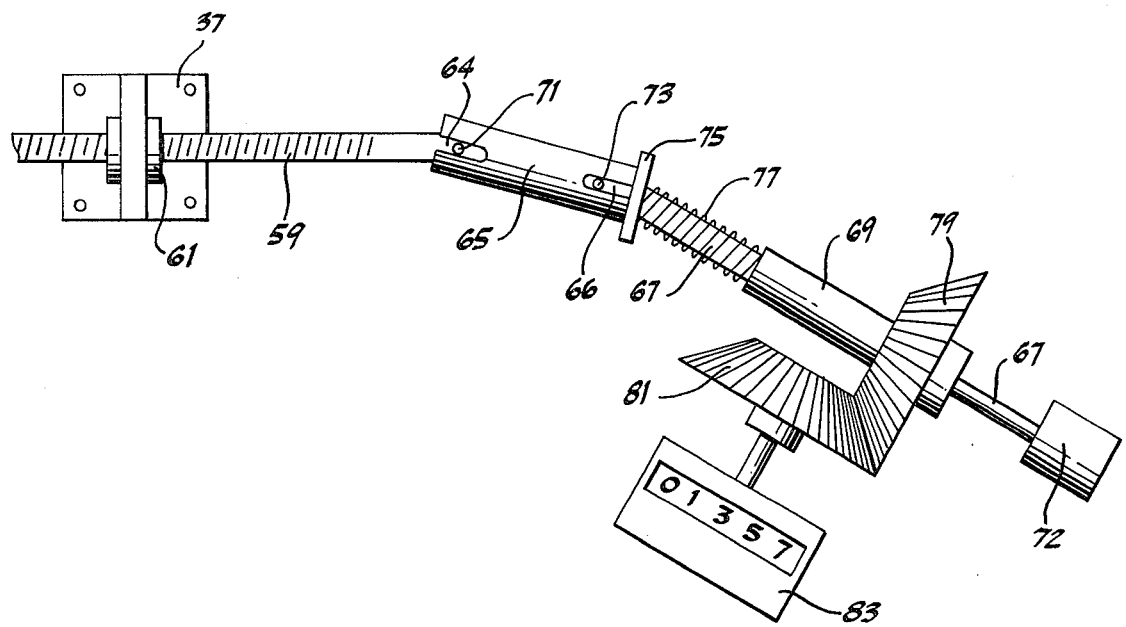
FIG. 5 shows a side elevation, partly cut away, of the lead screw adjustment mechanism of FIG. 1.

FIG. 5 illustrates drive bracket 37 with nut 61 fixedly mounted thereon and threadably engaged by lead screw 59. Lead screw 59 has a pin 71 therethrough which engages a slot 64 in hollow cylindrical connector or coupling 65. The other end of coupling 65 has a slot 66 engaged by a pin 73 of drive shaft 67 which in turn rotates in bearing 69. A collar 75 is pressed against coupling member 65 by a spring 77 to keep coupling 65 firmly engaged with pin 71 at the end of lead screw 59. The other end of drive shaft 67 has knob 72 connected to the end thereof and has a conical or bevel gear 79 fixedly attached thereon which engages a conical or bevel gear 81 which in turn is fixedly connected to the shaft of a counter 83. As knob 72 is rotated, counter 83 registers the number of rotations or fractions thereof whereby the rotation of lead screw 59 can be accurately monitored and measured and, hence, the position of drive bracket 37.

Figure 6:
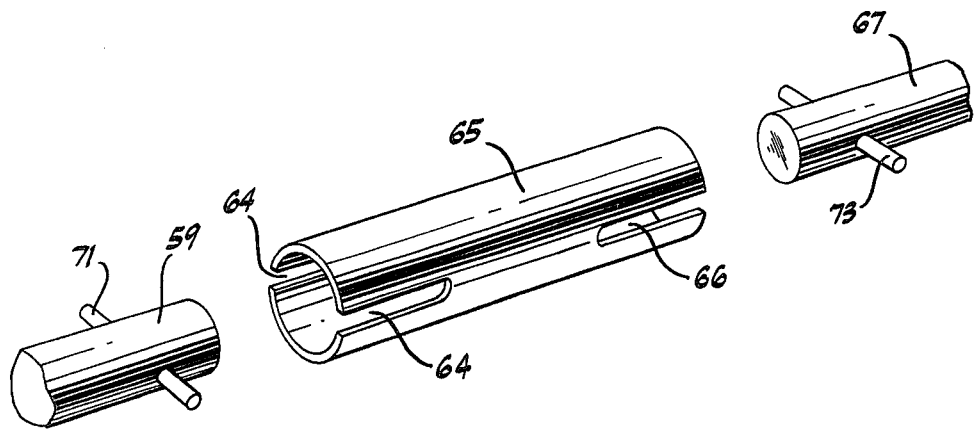
FIG. 6 illustrates an exploded perspective view, partly cut away, of the lead screw and drive shaft coupler of FIG. 1.

In FIG. 6, an exploded view of coupling 65, lead screw 59 and drive shaft 67 are shown. Pin 71 radially passes through the end of lead screw 59 and engages slots 64 of coupling 65. Slots 66 engage pin 73 which radially passes through the end of drive shaft 67.

Operation of the invention can best be described by reference to FIG. 1, wherein motor 57 turns motor shaft 55, rotating arm 53 thereby moving drive rod 49 and pivoting pivot frame 41 in fixed arcuate reciprocating motion about bolts 43 in brackets 45. As pivot frame 41 pivots, bearing member 33 moves in adjustable arcuate motion on elongated arm 39 and drives drive plate 13 in adjustable reciprocating rectilinear motion along support rod 21. Motor 57 can be of the type having a pawl brake well known to those skilled in precision rotating devices, whereby its rotary motor can be precisely stoped in predetermined positions. Other types of well-known friction brakes may be used to precisely stop and locate the motor shaft.

By rotation of lead screw 59, bearing member 33 is slidably moved along elongated arm 39 of pivot frame 41 to adjust the magnitude of arcuate motion of bearing wheel 35 engaged by slot 17 of drive plate 13. If bearing member 33 is located close to bolt 43, there is less magnitude of arcuate motion of wheel bearing 35 than when bearing member 33 is located close to the other end of elongated arm 39 adjacent drive rod 49. Therefore, by adjusting the position of bearing member 33 along elongated arm 39, the magnitude of the rectilinear reciprocating motion of drive plate 13 along rod 21 is adjustably controlled. Consequently, piston bracket 25 connected to drive plate 13 is moved in an adjustable manner to accurately and precisely control the motion of piston 29 in pump cylinder 31, a positive displacement pump, to dispense precise volumes of fluid from the interior thereof.

Referring now to FIG. 4, it should be apparent that when bearing member 33 is located at the extreme end of elongated arm 39 oppositely disposed from bolt 43, a maximum stroke of piston 29 is achieved. Moreover, it should be apparent that the minimum volume of pump cylinder 31 is always precisely the same regardless of the position of bearing member 33 on elongated arm 39. Therefore, a precise minimum volume reference point is always obtained to provide a precise reference volume from which every piston stroke, regardless of the length thereof, may be accurately referenced and calibrated.

Turning now to FIG. 2, it can be observed that as bearing member 33 is moved toward the rotating or pivot position of pivot frame 41 at bolt 43, bolt 40 which fastens wheel bearing 35 to bearing member 33, can be moved in coaxial alignment with bolt 43. Consequently, there will be no motion of bolt 40 under this condition and no motion of drive plate 13. Therefore, the motion of drive plate 13 may be adjusted from substantially zero motion at this point of alignment of bolts 40 and 43 out to a maximum rectilinear motion when bearing member 33 is located at the driven end of elongated arm 39. As a result, piston 29 may be driven from substantially zero motion when bolt 40 is located in alignment with bolt 43, to a maximum stroke obtained when bearing member 33 is located at the driven end of elongated arm 39 at a maximum distance away from bolt 43.

Adjustment of bearing member 33 can best be understood by referring to FIG. 5. By rotating knob 71, drive shaft 67 is turned which motion is coupled through coupling 65 to lead screw 59, which moves drive bracket 37 and bearing member 33 (not illustrated) along elongated arm 39 (not illustrated). As pivot frame 41 of FIG. 1 moves in arcuate reciprocating motion, the small arcuate motion of the end of lead screw 59 is movably connected to drive shaft 67 by coupling 65. Pin 71 of lead screw 59 of FIG. 5 engages slot 64 in coupling 65 and pin 73 in drive shaft 67 is coupled to slot 66 of coupling 65. Consequently, regardless of the angular displacement of pivot frame 41 and lead screw 59, knob 71 can rotatably turn lead screw 59 to position drive bracket 37 and bearing member 33 along elongated arm 39 to any desired position to accurately and precisely adjust the motion of drive plate 13 to achieve the required stroke length of piston 29.

It now should be apparent that the present invention provides a mechanical arrangement which may be employed in conjunction with an adjustable positive displacement pump driving mechanism for precisely and accurately moving the pump piston in predetermined variable rectilinear motion with a repeatable and precisely determined reference position such that precise and accurate volumes of fluids may be dispensed therefrom.

Although particular components, etc. have been discussed in connection with a specific embodiment of a mechanism for translating fixed reciprocating motion into precisely adjustable rectilinear reciprocating motion in accordance with the teachings of the present invention, others may be utilized. Furthermore, it will be understood that although an exemplary embodiment of the present invention has been disclosed and discussed, other applications and mechanical arrangements are possible and that the embodiments disclosed may be subjected to various changes, modifications, and substitutions without necessarily departing from the spirit of the invention.

What is claimed is:

1. Precision drive mechanism for converting fixed arcuate reciprocating motion into adjustable reciprocating rectilinear motion, comprising:

a base member adapted to receive a drive plate in slidable connection therewith;

a first drive plate having an elongated slot therein, said drive plate being slidably attached to said base member to provide rectilinear motion of said drive plate with respect to said base member;

a first pivot frame having an elongated arm of which one end is pivotally attached to said base member, the other end of said elongated arm being adapted to be connected to a source of fixed arcuate reciprocating motion;

a first bearing member slidably attached to said elongated arm of said pivot frame and substantially movable over the entire length thereof, said bearing member being adapted to threadably engage lead screw means;

first lead screw means for threadably engaging said bearing member and being rotatably attached to said pivot frame, said lead screw means moving said bearing member along said elongated arm of said pivot frame when said lead screw is rotated;

First turning means attached to said first lead screw means for adjustably rotating said first lead screw means, said first turning means having a projecting pin extending radially outward from said first lead screw means adjacent the end of said first lead screw means, a drive shaft rotatably mounted to said base member and having one end adapted to be turned with the other end thereof having a projecting pin extending radially outward therefrom, and a hollow cylindrical connector having two ends with each end having at least one longitudinal slot therein where one end of said hollow cylindrical connector is in sliding movable contact over the end of said first lead screw means with said at least one longitudinal slot engaging said projecting pin therein and the other end of said hollow cylindrical connector is in sliding movable contact over said other end of said drive shaft with said at least one longitudinal slot engaging said projecting pin of said drive shaft whereby said first lead screw means can pivot in reciprocating angular motion with respect to said drive shaft and said drive shaft can be turned to rotate said first lead screw means; and first connecting means fixedly attached to said first bearing member for slidably connecting said first drive plate through said elongated slot to said first bearing member whereby said first drive plate is moved in reciprocating rectilinear motion with respect to said base member by said first pivot frame when said other end of said elongated arm of said first pivot frame is connected to a source of fixed arcuate reciprocating motion, the magnitude of the reciprocating motion of said first drive plate being adjustable by moving said first bearing member along said elongated arm of said first pivot frame by rotating said first lead screw means.

2. The precision mechanism described in claim 1 further including an elongated driving rod having one end thereof rotatably connected to said other end of said elongated arm of said first pivot frame and said other end of said elongated driving rod being adapted to be connected to a source of rotary motion.

3. The precision mechanism described in claim 2 further including a source of rotary motion comprising a motor having a rotating drive shaft and a connecting arm, said connecting arm being connected to one end of said rotating drive shaft, the other end of said connecting arm being adapted to rotatably connect to said elongated driving arm.

4. The precision mechanism described in claim 1 further including a counter attached to said drive shaft for counting the number of revolutions of said lead screw whereby said bearing member is precisely positioned on said elongated arm of said pivot frame to adjustably control the magnitude of said drive plate rectilinear motion.

5. The precision mechanism described in claim 1 further including:
- at least one additional drive plate having an elongated slot therein, said at least one additional drive plate being slidably attached to said base member to provide rectilinear motion of said at least one additional drive plate with respect to said base member;
- at least one additional pivot frame having an elongated arm of which one end is pivotally attached to said base member, the other end of said elongated arm being rotatably attached to said elongated driving arm;
- at least one additional bearing member slidably attached to said elongated arm of said at least one additional pivot frame and moveable over substantially the entire length thereof, said at least one additional bearing member being adapted to threadably engage at least one additional lead screw means;
- at least one additional lead screw means for threadably engaging said at least one additional bearing member and being rotatably attached to said at least one additional pivot frame, said at least one additional drive screw means moving said at least one additional bearing member along said elongated arm of said at least one additional pivot frame when said at least one additional lead screw is rotated;
- at least one additional turning means attached to said at least one additional lead screw means for adjustably rotating said at least one additional lead screw means, said at least one additional turning means being substantially identical to said first turning means; and
- at least one additional connecting means fixedly attached to said at least one additional bearing member for slidably connecting said at least one additional drive plate through said elongated slot to said at least one additional bearing member whereby said at least one additional drive plate may be moved in reciprocating rectilinear motion with respect to said base member by said at least one additional pivot frame and said elongated driving arm when said elongated driving arm is connected to a source of rotary motion, the magnitude of the rectilinear motion of said at least one additional drive plate being adjustable by moving said at least one additional bearing member along said elongated arm of said at least one additional pivot frame by rotating said at least one additional lead screw means.

6. Precision drive mechanism for adjustably driving a positive displacement syringe, comprising:
- a base member adapted to receive a drive plate in slidable connection therewith;
- a drive plate having an elongated slot therein and being adapted for connection to the piston shaft of a positive displacement syringe, said drive plate being slidably attached to said base member;
- positive displacement pump means having a movable piston, a piston shaft connected to said piston, a cylinder into which said piston is movably inserted and inlet and outlet check valves attached to said cylinder to control the flow of fluids into and out of said cylinder in response to the motion of said piston;
- a pivot frame having an elongated arm of which one end is pivotally attached to said base member, the other end of said pivot arm being adapted to be rotatably connected to an elongated driving rod;
- an elongated driving rod rotatably connected to said other end of said pivot arm the other end of said elongated driving arm being adapted to be connected to a source of rotary motion;
- a source of rotary motion rotatably connected to said other end of said elongated driving arm to move said other end in circular motion;
- a bearing member slidably attached to said elongated arm of said pivot frame, and movable over substantially the entire length thereof, said bearing member being adapted to threadably engage lead screw means;
- lead screw means for threadably engaging said bearing member and being rotatably attached to said pivot frame, said lead screw means moving said bearing member along said elongated arm of said pivot frame when said lead screw is rotated; and
- turning means attached to said lead screw means for adjustably rotating said lead screw means, said turning means having a projecting pin extending radially outward from said lead screw means adjacent the end of said lead screw means, a drive shaft rotatably mounted to said base member and having one end adapted to be turned with the other end thereof having a projecting pin extending radially outward therefrom, and a hollow cylindrical connector having two ends with each end having at least one longitudinal slot therein where one end of said hollow cylindrical connector is in sliding movable contact over the end of said lead screw means with said at least one longitudinal slot engaging said projecting pin therein and the other end of said hollow cylindrical connector is in sliding movable contact over said other end of said drive shaft with said at least one longitudinal slot engaging said projecting pin of said drive shaft whereby said lead screw means can pivot in reciprocating angular motion with respect to said drive shaft and said drive shaft can be turned to rotate said lead screw means; and
- connecting means fixedly attached to said bearing member for slidably connecting said drive plate through said elongated slot to said bearing means whereby said drive plate and said piston of said positive displacement pump may be moved in reciprocal rectilinear motion with respect to said base member by said source of rotary motion, the magnitude of the reciprocating rectilinear motion of said drive plate and piston being adjustable by moving said bearing member along said elongated arm of said pivot frame by rotating said lead screw means, thereby adjusting the magnitude of the reciprocal rectilinear motion of said piston and pumping capacity of said positive displacement pump.

* * * * *